Dec. 21, 1965 M. J. BASSO 3,225,197
FAST NEUTRON DETECTION AND FLUX DENSITY MEASUREMENT
Filed May 10, 1963

INVENTOR,
MICHAEL J. BASSO.
BY
*Harry M. Saragovitz*
ATTORNEY.

United States Patent Office 3,225,197
Patented Dec. 21, 1965

3,225,197
FAST NEUTRON DETECTION AND FLUX DENSITY MEASUREMENT
Michael J. Basso, Asbury Park, N.J., assignor to the United States of America as represented by the Secretary of the Army
Filed May 10, 1963, Ser. No. 279,645
3 Claims. (Cl. 250—83.1)
(Granted under Title 35, U.S. Code (1952), sec. 266)

The invention described herein may be manufactured and used by or for the Government for governmental purposes, without the payment of any royalty thereon.

This invention relates to a method and means for detecting and measuring fast neutron flux as a function of time.

With the advent of nuclear research and continuing development in the uses of nuclear phenomena a need has arisen to know the intensity of fast neutron flux environments. Existing equipment for measuring these high intensity environments has been found to be inadequate in many ways. Highly sensitive radiation measuring devices have been developed to an advanced state but such means cannot be used in connection with measurement of neutron flux close to a source such as a nuclear reaction.

The present invention provides a technique and apparatus which has low sensitivity and adequate response range to high density fast neutron flux. The apparatus for detection and measurement of such environments consists of means which embodies the phenomena of nuclear magnetic resonance. Such means may consist of a sample body of hydrogenous material which is subjected to electromagnetic oscillations and a magnetic field under conditions wherein the hydrogen nuclei of the body of hydrogenous material are sustained in a resonant state. Under such conditions the nuclei absorb a substantial amount of energy from the oscillator which is sustaining the resonant state. A recorder coupled to the oscillator measures any change as a function of time of this input energy.

When the hydrogenous body is subjected to a fast neutron environment the neutrons will collide with some of the resonating nuclei and knock them out of their resonant state. The number of nuclei thus knocked out are proportional to the flux density of the neutron environment. Proper calibration of the apparatus will provide a true neutron flux density reading as a function of time upon a proper recorder.

A more detailed description of the construction and operation of the invention, including the manner in which the device discriminates against gamma particles present in the environment under observation, will be set forth hereinafter.

It is a primary object of the invention to detect and measure the flux density of fast neutrons.

A further object of the invention is to measure fast neutron flux densities while discriminating against gamma particles present in an environment including gamma rays and neutrons.

A further object of the invention is to provide a neutron flux measuring method having a fast time response characteristic.

A further object of the invention is to provide a technique of the type indicated which will measure extremely high neutron flux densities without saturating.

A further object of the invention is to provide a fast neutron flux measuring method which is stable in operation and has a substantially linear response characteristic.

Other objects and features of the invention will more fully appear from the following description and will be particularly pointed out in the claims.

To provide a better understanding of the invention, particular embodiments thereof will be described and illustrated in the accompanying drawing wherein.

Figure 1:
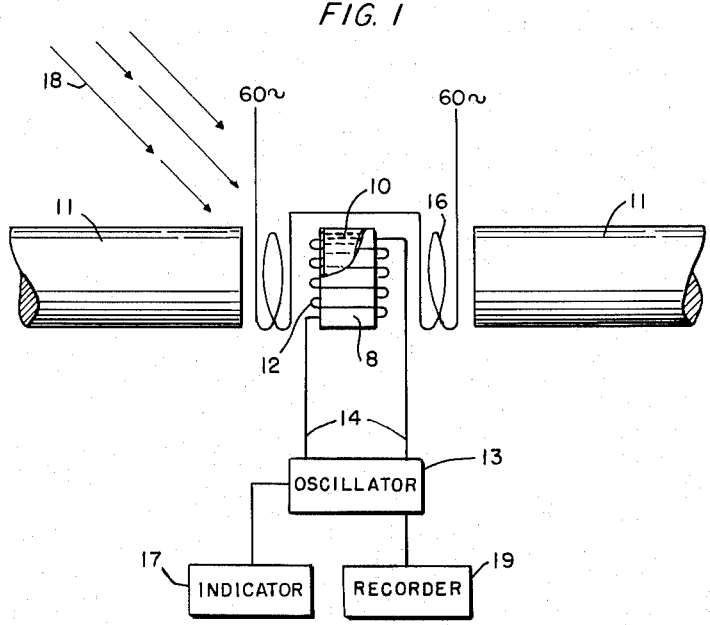
FIGURE 1 is a diagrammatic illustration of the physical elements of the invention.

The apparatus for performing the technique of the invention consists of a holder or container 8 embracing a quantity of hydrogenous material. A nonmagnetic container filled with water 10 constitutes a suitable hydrogenous sample or body. The body 10 is received between the poles of a magnet 11 and has closely coupled thereto a coil 12 connected to an electronic oscillator 13 through the leads 14. Change in absorption of power from the oscillator by the sample is indicated by a readout device connected thereto.

It may be desirable in certain applications of the invention to provide means for modulating the field strength of the magnet 11. This may be done in any suitable manner such as by introducing an electromagnetic coil 16 into the field thereof. This coil is energized by a source of current which may supply a modulated input having a pulsing or sinusoidal wave. Such current source may be a 60 v. power supply.

In operation after the sample 10 has been put in place and temporarily isolated from the nuclear environment to be studied the oscillator 13 is activated and its frequency is adjusted until the resonant frequency of the hydrogen nuclei contained in the sample is reached. At this time a sharply defined absorption of the power output from the oscillator will be observed. The degree of absorption is proportional to the number of nuclei resonating at the prescribed resonant frequency. This point is noted upon an indicator 17 for future reference.

The sample is then exposed to the neutron environment 18 which may, for example, be created by a nuclear reaction. Since the proton cross section for neutrons is large the nuclei will suffer numerous collisions causing an antiresonating state. The energy absorbed from collisions will distort the hydrogen nuclei so that momentarily they are not in a resonating state. The rate of change of this resonating state is related to the rate of change in the fast neutron environment. This change will appear upon the face of a recorder 19 which may be an oscilloscope connected to the oscillator and thus with a suitable known time base adjustment of the recorder the measurement of neutron flux density as a function of time is recorded.

The system above described may be calibrated to record the changes in energy directly in neutron flux density by exposing the sample to known environments.

With the system and apparatus above described, measurements may be taken close to the actual point of the reaction without danger of harmful exposure to the observer. To provide for this the indicator, the recorder and oscillator may be connected to coil 12 at the sample by a long extension conduit such as a coaxial cable. Thus observation and photographic recording of the readout signal is accomplished without danger to personnel.

In many instances the environment measured is composed of neutrons and gamma rays. Since it is a chief objective of the present invention to measure neutron flux only, it is desirable to eliminate the effect of gamma rays upon the output signal representing neutron flux. One of the major capabilities of the invention is the discrimination against gamma rays present in the measured environment. Since in the technique of the invention nuclear magnetic resonance is used as the method of neutron detection, gammaradiation will appear to a negligible extent only in the displayed signal. Gamma rays do react to nuclei to a slight degree but react primarily with orbital electrons. Thus the reaction of the nuclei to the incident neutrons as in the present technique is substantially the only phenomena measured. Thus the signal change represents the true neutron dose rate as a function of time.

It is believed a discussion of the functional phenomena involved in the technique of the invention will provide a better understanding thereof. The body of hydrogenous material 10 is composed of individual gyromagnetic bodies which have associated therewith certain inherent angular momentum or spin and a certain magnetic moment. Thus the individual gyromagnetic bodies can be thought of as minute microscopic spinning magnets.

In the absence of a polarizing magnetic field and for an ensemble of such bodies in a state of thermal equilibrium the individual bodies are randomly distributed and are experiencing random vibrations due to thermal agitations whereby the total magnetic moment or the vector summation of all the magnetic moments is substantially zero on an average.

However when this ensemble of gyromagnetic bodies is immersed in a polarizing magnetic field a substantial portion of the microscopic magnets tend to line up with the flux lines of the magnetic field in a common attitude thereby creating a total magnetic moment for the ensemble.

In the present invention a second magnetic influence may be applied to the ensemble, namely, means to vary the intensity of the magnetic field by energizing the coils 16 with an alternating current such as by a 60 v. power source. By so doing the axes of spin of the individual gyromagnetic bodies will be agitated thus producing conditions whereby the chances of collisions with incident neutrons composing the measured environment will be substantially increased. Thus increased amplitude in the changing output of the oscillator will be achieved with a resulting increase in accuracy of the recorder.

Figure 2:
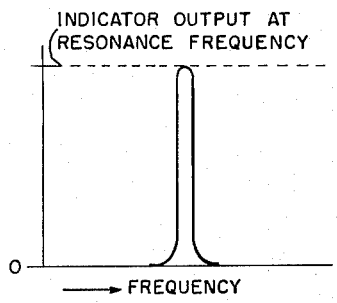
FIGURES 2 and 3 are graphic representations of operating outputs of the apparatus.

FIGURE 2 of the drawings shows a curve indicating approximate values of oscillator output in terms of elapsed time as read upon the indicator 17 when the state of resonance of the gyromagnetic bodies in the sample is reached. This condition is maintained during operation of the device when no high energy environment is present.

Figure 3:
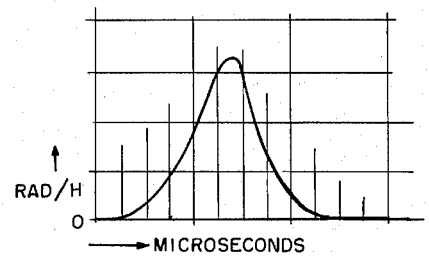

When the sample 10 is immersed in the environment measured the output of the oscillator will change in the manner indicated by the curve shown in FIGURE 3. This curve shows the approximate changes in oscillator output as a function of time. These changes are in proportion to the neutron flux density of the environment.

The device of the invention may be used to measure total integrated dose of neutrons delivered per pulse. To achieve this result a somewhat different procedure is followed. In this case the relaxation time of the sample material must be considered. This property is the time in seconds $T_1$ after the sample has been subjected to the magnetic field of the magnet 11 and the field has been removed and the time when complete relaxation of the gyromagnetic bodies therein have again reached a normal disposition as they were before the field was applied. The following is a partial list of materials showing their characteristics in this respect. The following measurements were taken at 20° C. and at a frequency 29 mc. per sec.

For protons in Polar liquids:

| | (Viscosity in centipoises) | $T_1$ sec. |
| --- | --- | --- |
| Water | 1.02 | 2.3 |
| Glycerine | 1,000 | 0.023 |
| Sulphuric acid | 25 | .07 |

For protons in hydrocarbons:

| | (Viscosity in centipoises) | $T_1$ sec. |
| --- | --- | --- |
| Petroleum ether | 0.48 | 3.5 |
| Kerosene | 1.55 | 0.7 |
| Mineral oil | 240.0 | 0.007 |

For the measurement of the total dose of neutrons per pulse the time $T_1$ must be much greater than the duration of the pulse. A suitable material could be for example water or petroleum ether.

To make this measurement the oscillator 13 is adjusted to apply the required resonant frequency to the material. The magnet is then turned on and after saturation has been attained the magnetic field is removed and immediately thereafter the sample is subjected to the environment. If the duration of the neutron pulse was 10 microseconds and the time $T_1$ is 2.3 seconds relaxation of the material would be very slight during the 10 microsecond period. Therefore the number of bodies knocked out of resonance during the whole pulse time would add and the indicator will show the total integrated dose of neutrons delivered per pulse.

What is claimed is:

1. A method of measuring neutron flux as a function of time in a fast neutron environment comprising first supporting a sample of material having a high content of hydrogen nuclei in a neutron free environment while contained in a nonmagnetic receptacle, applying a magnetic field to said material whereby some of the gyromagnetic bodies in said material will be oriented in a common attitude, disposing a radio frequency coil within said magnetic field with the turns thereof arranged to produce a field having its longitudinal axis extending at 90° to the flux lines of said magnetic field and passing through said sample material, energizing said coil and adjusting the frequency of the input current to that of the resonant frequency of the sample, measuring the input current to said coil, then immersing the hydrogenous sample in a high intensity fast neutron environment while the nuclei are in their resonant state whereby the neutrons will collide with some of the nuclei momentarily disrupting their resonance, and again measuring the radio frequency input to said coil, the summation of the effects of the collisions indicating the changing neutron flux of said environment corresponding to the change in absorption of the radio frequency input as a function of time.

2. A method of measuring neutron flux as a function of time in a fast neutron environment according to claim 1 and periodically varying the magnetic field at low audio frequency.

3. A method of measuring total integrated dose of neutrons delivered per pulse comprising supporting a sample of material having a high content of hydrogen nuclei and a high relaxation time in a neutron free environment while in a nonmagnetic receptacle and between the poles of a magnet, disposing a radio frequency coil between said poles with the turns thereof arranged to produce a field having its longitudinal axis at 90° to the magnet flux lines and passing through said sample, energizing said coils and adjusting the frequency of the input current to that of the nuclear magnetic resonant frequency of the sample, then applying a magnetic field to the sample and removing the field, and immediately thereafter during said relaxation time immersing the sample in a neutron environment in pulse form having a duration of much shorter time than the said relaxation period of the material detecting a change in input to said coil to indicate the total integrated dose of neutrons delivered per pulse.

References Cited by the Examiner
UNITED STATES PATENTS
3,113,263  12/1963  Collins _____ 324—0.5

OTHER REFERENCES

Connor: Physical Review Letters, vol. 3, No. 9, Nov. 1, 1959, pages 429–431 (QC.1 P44).

Fuschillo: Journal of Applied Physics, vol. 28, No. 10, Oct. 1957, pages 1073 to 1081 (QC 1.J82).

Gupta: Kolloid Zeitschrift, Bd. 174, Heft 1, pages 74 and 75, Jan. 1961 (QD 549 K8).

Kaplan et al.: Physical Review, vol. 129, No. 5, March 1, 1963, pages 1919 to 1935 (QC–1P4).

Pound et al.: Review of Scientific Instruments, vol. 21, No. 3, pages 219 to 225, March 1950 (Q 187–R5).

CHESTER L. JUSTUS, *Primary Examiner.*

MAYNARD R. WILBUR, *Examiner.*